(12) United States Patent
Hou et al.

(10) Patent No.: US 9,139,192 B2
(45) Date of Patent: Sep. 22, 2015

(54) SYSTEM AND METHOD FOR SYNCHRONIZING ERPM AND GEAR CHANGES OF A WORK VEHICLE

(71) Applicant: CNH Industrial America, LLC, New Holland, PA (US)

(72) Inventors: Yanming Hou, Pleasant Prairie, WI (US); Garth Harvey Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/377,906

(22) PCT Filed: Jan. 23, 2013

(86) PCT No.: PCT/US2013/022639
§ 371 (c)(1),
(2) Date: Aug. 11, 2014

(87) PCT Pub. No.: WO2013/122719
PCT Pub. Date: Aug. 22, 2013

(65) Prior Publication Data
US 2015/0032344 A1      Jan. 29, 2015

Related U.S. Application Data

(60) Provisional application No. 61/599,630, filed on Feb. 16, 2012.

(51) Int. Cl.
| | | |
|---|---|---|
| *G06F 17/00* | (2006.01) | |
| *B60W 10/11* | (2012.01) | |
| *B60W 10/06* | (2006.01) | |
| *B60W 30/14* | (2006.01) | |
| *B60W 30/19* | (2012.01) | |
| *F16H 61/08* | (2006.01) | |
| *F16H 63/50* | (2006.01) | |

(52) U.S. Cl.
CPC ............... *B60W 10/11* (2013.01); *B60W 10/06* (2013.01); *B60W 30/143* (2013.01); *B60W 30/19* (2013.01); *F16H 61/08* (2013.01); *F16H 63/502* (2013.01); *B60W 2300/15* (2013.01); *B60W 2710/0644* (2013.01)

(58) Field of Classification Search
None
See application file for complete search history.

(56) References Cited

U.S. PATENT DOCUMENTS

| | | |
|---|---|---|
| 5,323,667 A | 6/1994 | Tweed et al. |
| 2002/0160877 A1 | 10/2002 | Graf et al. |
| 2010/0145581 A1 | 6/2010 | Hou |

FOREIGN PATENT DOCUMENTS

| | | | | |
|---|---|---|---|---|
| EP | 0786609 A3 | 6/1998 | | |
| WO | WO 2013122719 A1 * | 8/2013 | ............ | B60W 10/06 |

* cited by examiner

*Primary Examiner* — Dirk Wright
(74) *Attorney, Agent, or Firm* — Sue C. Watson (57) ABSTRACT

A method for operating a work vehicle in an automatic speed control mode is disclosed. The method may generally include receiving an input associated with a desired ground speed of the work vehicle, determining with a controller to implement a gear change and an erpm change in order to maintain the work vehicle at the desired ground speed, wherein the gear change includes a gear prep phase and a ratio change phase and controlling a timing parameter of at least one of the gear change or the erpm change such that the ratio change phase and the erpm change occur substantially simultaneously.

20 Claims, 5 Drawing Sheets

SYSTEM AND METHOD FOR SYNCHRONIZING ERPM AND GEAR CHANGES OF A WORK VEHICLE

CROSS-REFERENCE TO RELATED APPLICATIONS

This application is based upon and claims priority to U.S. Provisional Patent Application No. 61/559,630, filed on Feb. 16, 2012 and entitled "System and Method for Synchronizing ERPM and Gear Changes of a Work Vehicle," the disclosure of which is hereby incorporated by reference herein in its entirety for all purposes.

FIELD OF THE INVENTION

The present subject matter relates generally to work vehicles capable of operating in an automatic, continuous ground speed control mode and, more particularly, to a system and method for synchronizing erpm and gear changes while a work vehicle is operating in such an automatic speed control mode.

BACKGROUND OF THE INVENTION

The ground speed of a work vehicle, such as a tractor or other agricultural vehicle, is primarily determined by the set engine speed (i.e., engine rpm, which is referred to herein as "erpm") and the set transmission gear (referred to herein as "gear ratio" or simply "gear"). When a work vehicle is operating in a manual speed control mode, the erpm is typically set by an erpm throttle lever and the gears are typically set by up/down shift buttons. Thus, to maintain a desired ground speed, the operator must manually adjust both the gear setting and the throttle lever position.

To simplify operator control and to increase the efficiency (e.g., fuel efficiency) of a work vehicle, automatic speed control modes have been developed that allow both erpm control and gear ratio control to be integrated together. For example, U.S. Pat. Pub. No. 2010/0145581, (filing date of Dec. 8, 2008) entitled "Automatic Productivity Management Control with Standard Power Shift Transmission" and assigned to CNH America LLC, discloses a work vehicle with an automatic speed control mode in which an electronic controller may be utilized to make both erpm changes and gear changes based on one or more inputs received by the controller (e.g., vehicle loads, actual ground speed, brake position, throttle position, vehicle slippage and/or the like) in order to maintain the work vehicle at a desired ground speed. Using such an automatic speed control mode, if the load on the work vehicle increases, the controller may automatically lower the gear setting and increase the erpm to accommodate the increased load while still maintaining the desired ground speed. Similarly, if the load on the work vehicle decreases, the controller may automatically increase the gear setting and decrease the erpm in order to increase efficiency and still maintain the desired ground speed. Such an ability to automatically adjust the gear setting and erpm may allow the engine in a work vehicle to continuously operate at or near its maximum torque curve, thereby maximizing its efficiency. The disclosure of U.S. Pat. Pub. No. 2010/0145581 is hereby incorporated by reference herein in its entirety for all purposes.

While the automatic speed control mode described above provides numerous advantages, improvements are still desired to further enhance the overall operation of a work vehicle operating in such a control mode. For example, when it is determined that both an erpm change and a gear change is needed to maintain a desired ground speed, the controller of a work vehicle operating in a conventional automatic speed control mode is configured to simultaneously transmit control commands to the engine and transmission in order to implement such changes. However, due to the differences in system responses to the control commands, the erpm and gear changes are often initiated at different points in time and/or occur at different rates. As a result, the ground speed of the work vehicle momentarily increases or decreases by a significant degree, thereby causing the motion of the vehicle to feel jerky or rough. Unfortunately, given that most work vehicles operate under continuously changing load conditions, the erpm and gear settings of such vehicles must be changed frequently, resulting in recurring and sudden jerky vehicle motion.

Accordingly, a system and method for synchronizing erpm and gear changes while a work vehicle is operating in an automatic speed control mode such that the motion of the vehicle is smoothed during such changes would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for operating a work vehicle in an automatic speed control mode. The method may generally include receiving an input associated with a desired ground speed of the work vehicle, determining with a controller to implement a gear change and an erpm change in order to maintain the work vehicle at the desired ground speed, wherein the gear change includes a gear prep phase and a ratio change phase and controlling a timing parameter of at least one of the gear change or the erpm change such that the ratio change phase and the erpm change occur substantially simultaneously.

In another aspect, the present subject matter discloses a work vehicle. The work vehicle may generally include an engine, a transmission coupled to the engine and a controller configured to control an erpm change of the engine and a gear change of the transmission in order to maintain a desired ground speed of the work vehicle. The gear change may include a gear prep phase and a ratio change phase. In addition, the controller may be configured to control a timing parameter of at least one of the gear change or the erpm change such that the ratio change phase and the erpm change occur substantially simultaneously.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a system and method for synchronizing erpm and gear changes for a work vehicle operating in an automatic speed control mode. Specifically, in several embodiments, an electronic controller of the work vehicle may be configured to control one or more timing parameters of the erpm change and/or the gear change such that the erpm and gear changes occur substantially simultaneously, thereby smoothing the motion of the work vehicle. For example, in one embodiment, the controller may be configured to recognize and differentiate the unique shifting patterns of different gears under different operating conditions. By recognizing these distinctions for each gear change that a work vehicle may undergo while operating in an automatic speed control mode, the controller may be configured to adjust one or more timing parameters of the corresponding erpm change (e.g., the initiation and/or rate of change of the erpm change) such that the erpm change is substantially synchronized with the gear change.

Figure 1:
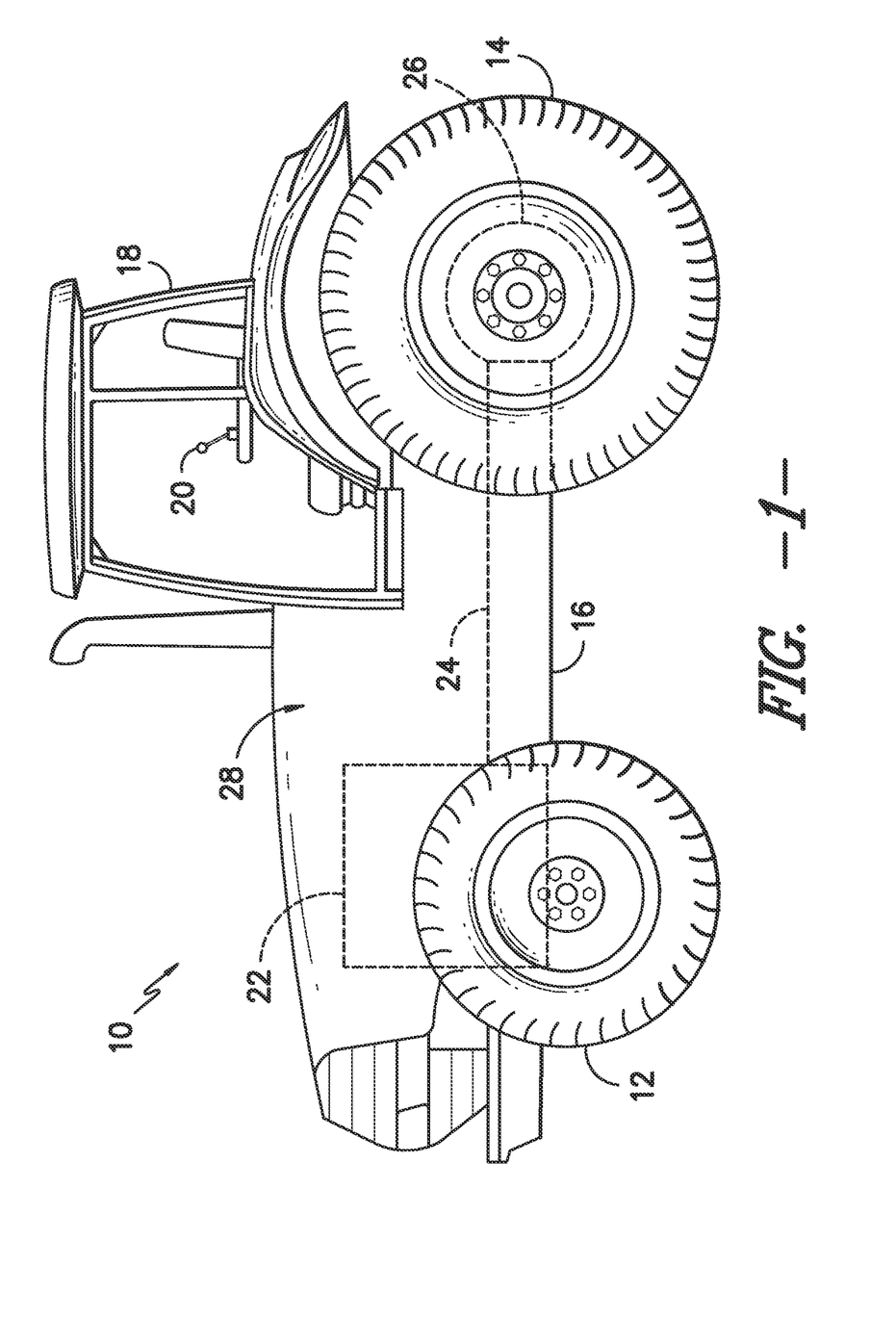
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, throttles, buttons, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a final drive 26. The engine 22, transmission 24, and final drive 26 may collectively define a power drive train 28 of the work vehicle 10.

It should be appreciated that the transmission 24 may generally comprise any suitable transmission known in the art that has a plurality of different, fixed gear ratios (i.e., gears). For example, in several embodiments, the transmission 24 may comprise a multispeed power shift transmission having a plurality of selectable gears (e.g., a plurality of selectable forward and reverse gears) and a plurality of internal clutches (e.g., hydraulically actuated clutches) that may be selectively actuated to engage the transmission in the differing gears. In such embodiments, the clutches may be configured to be automatically engaged within the transmission 24. For instance, an electronic controller 30 of the work vehicle 10 (described below with reference to FIGS. 2 and 3) may be configured to transmit suitable control commands or signals to the transmission 24 instructing it to actuate hydraulic pistons or other suitable actuators configured to engage/disengage the clutches.

In addition, it should be appreciated by those of ordinary skill in the art that, when utilizing a power shift transmission, the process of changing gears may generally be characterized by two phases: a gear prep phase and a ratio change phase. The gear prep phase generally begins when an initial control signal is transmitted from the controller 30 (FIGS. 2 and 3) indicating that a gear change is to be implemented and ends immediately prior to the initiation of the gear ratio change. Thus, the gear prep phase may generally include various steps related to preparing the transmission 24 to undergo a gear ratio change, such as filling empty clutches with hydraulic fluid, ramping up/down clutch pressures and/or the like. The gear prep phase may also incorporate any time delay that may occur between the time at which the initial control signal is sent and the time at which the transmission 24 responds to the initial control signal. Once the gear prep phase is completed, the gear changing process transitions to the ratio change phase, wherein the gear ratio change actually occurs. As such, the ratio change phase may include various steps related to implementing the actual gear change, such as detecting clutch slippage, swapping clutches, setting final clutch pressures and/or the like.

It should also be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and final drive 26 are coupled, a configuration common in smaller tractors. Still other configurations may use an articulated chassis to steer the work vehicle 10, or rely on tracks in lieu of the wheels 12, 14.

Figure 2:
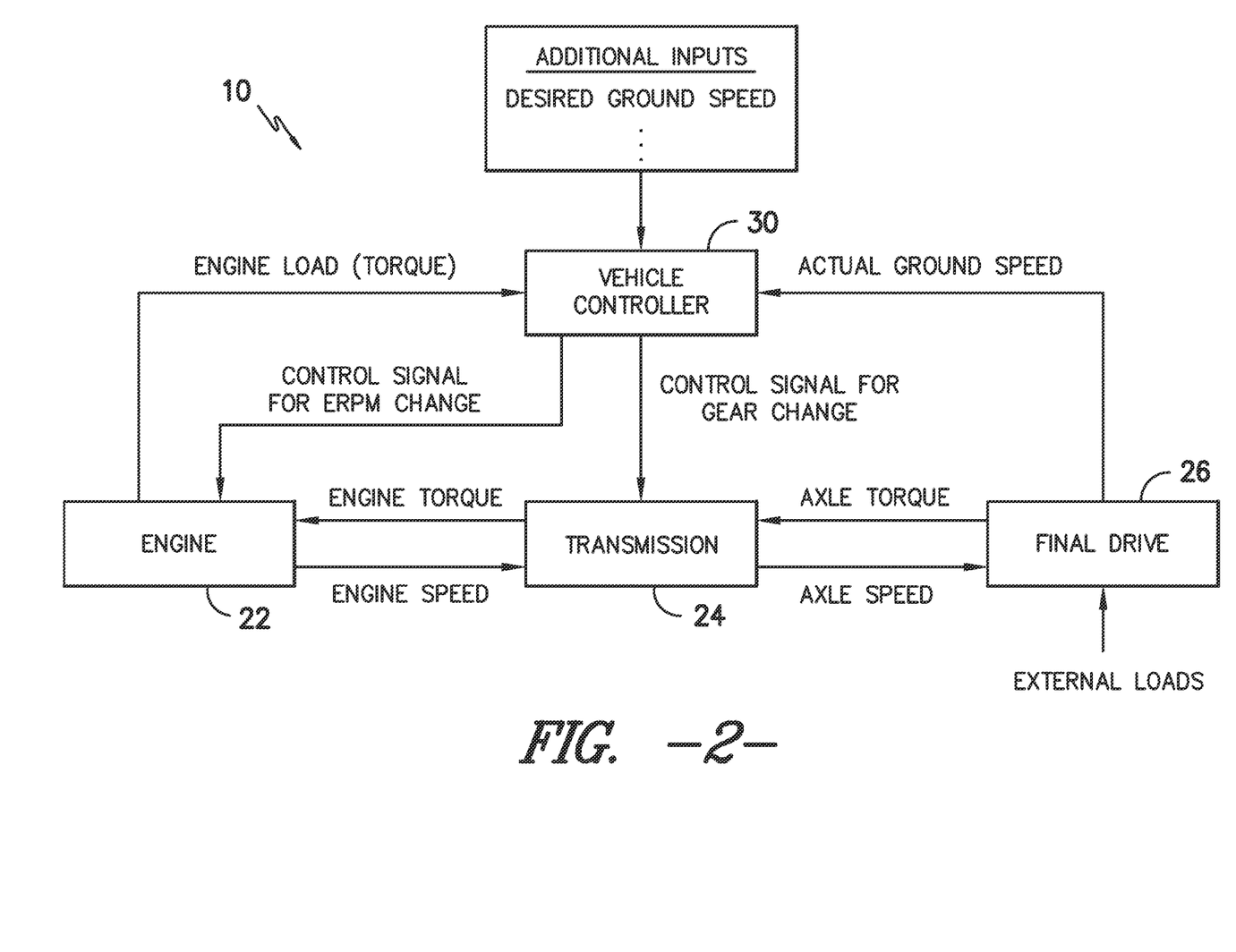
FIG. 2 illustrates a schematic diagram of one embodiment of various components of the work vehicle shown in FIG. 1 that may be utilized while operating in an automatic speed control mode.

Referring now to FIG. 2, a schematic diagram of one embodiment of several components of the work vehicle 10 operating in an automatic, continuous ground speed control mode (hereinafter referred to as "automatic speed control mode") is illustrated in accordance with aspects of the present subject matter. As shown, the work vehicle 10 includes an electronic controller 30 configured to control the operation of the both the engine 22 and the transmission 24. For example, the controller 30 may be configured to transmit suitable control signals to the engine 22 in order to change the erpm and/or other operating parameters of the engine 22. Similarly, the controller 30 may be configured to transmit suitable control signals to the transmission 24 in order to change the gear and/or other operating parameters of the transmission 24.

Additionally, as shown in FIG. 2, the controller 30 may be configured to receive various inputs related to the desired operation and/or the actual operating parameters/conditions of the work vehicle 10. For example, operator inputs related to the desired ground speed of the work vehicle 10 may be transmitted to the controller 30 via one of the control devices 20 (e.g., a throttle) housed within the operator's cab 18. In addition, the controller 30 may receive inputs related to the actual ground speed of the work vehicle 10. For instance, the controller 30 may be configured to receive inputs from a radar mounted on the bottom of the vehicle's chassis 16 (e.g., by measuring the Doppler Effect) or from a separate GPS system that relate to the actual ground speed of the work vehicle 10. Alternatively, the controller 30 may be configured to receive inputs related to the current erpm and selected gear ratio, which may be utilized together with additional information (e.g., the ratio of the final drive 26 and the size of vehicle's tires) in order to determine the actual ground speed of the work vehicle 10.

Moreover, the controller 30 may be configured to receive inputs corresponding to the engine loads (e.g., engine torque), which may then be used to estimate or otherwise determine the external loads of the work vehicle 10. For example, the final drive 26 may generate an axle torque based on the external loads that must be accommodated by the transmission 24. This axle torque, through the transmission 24, may then establish the engine torque that must be sustained by the engine 22. Thus, by continuously monitoring the engine torque (e.g., by using a suitable torque sensor), variations in the external loads of the work vehicle 10 may be detected.

It should be appreciated that controller 30 may also be configured to receive various other inputs relating to additional operating parameters/conditions of the work vehicle 10, such as tire slippage, input and output speeds of the transmission 24, internal shaft speeds of the transmission 24 (e.g., shaft speeds before and after one or more clutches of the transmission 24), whether the work vehicle 10 is operating in a field mode or a road mode, the status/position of the vehicle's brakes, various predetermined settings for the work vehicle 10 (e.g., max/min ground speed settings, max/min gear settings, system sensitivity settings), the status/operation of an implement being hauled by the work vehicle 10 and/or various other operating parameters/conditions. Such additional inputs may be derived, for example, from operator inputs, sensor inputs and/or may be stored within the memory of controller 30.

By analyzing the various inputs described above, the controller 30 may be configured to automatically control the operation of the engine 22 and the transmission 24 such that the erpm and gear ratio are set to the most suitable combination for maintaining the work vehicle 10 at the desired ground speed for a given set of operating parameters/conditions. For example, when the desired ground speed is increased/decreased (e.g., via an operator input), the controller 30 may be configured to correspondingly increase/decrease the erpm and gear settings. Similarly, if loads on the work vehicle 10 increase, the controller 30 may automatically downshift gears and increase erpm in order to accommodate the increased loads while maintaining the desired ground speed (until the maximum power is reached). On the other hand, if vehicle loads decrease, the controller 30 may automatically upshift gears and decrease erpm in order to maximize efficiency while maintaining the desired ground speed (until the minimum erpm for the work vehicle 10 is reached). Such automatic adjustments of the erpm and gear settings may allow the engine 22 to continuously operate at or near its maximum torque curve and the transmission 24 to operate at higher gears despite changing operating parameters/conditions, thereby maximizing the overall efficiency of the vehicle 10 as it is operating in the automatic speed control mode.

It should be appreciated that, in addition to the automatic speed control mode, the work vehicle 10 may also be configured to operate in various other modes including, but not limited to, a manual speed control mode. As is generally understood, when operating in a manual speed control mode, the erpm may be set by an erpm throttle lever positioned within the operator's cab 18 and the gear ratio may be set by up/down-shift buttons positioned within the operator's cab 18. Thus, in several embodiments, when operation of the work vehicle 10 is switched from the manual speed control mode to the automatic speed control mode, the erpm throttle lever may be used by the operator to set the desired ground speed. In such embodiments, the erpm throttle lever may include a minimum lever position designating the minimum desired ground speed of the work vehicle 10 and a maximum lever position designating the maximum desired ground speed of the work vehicle 10.

Figure 3:
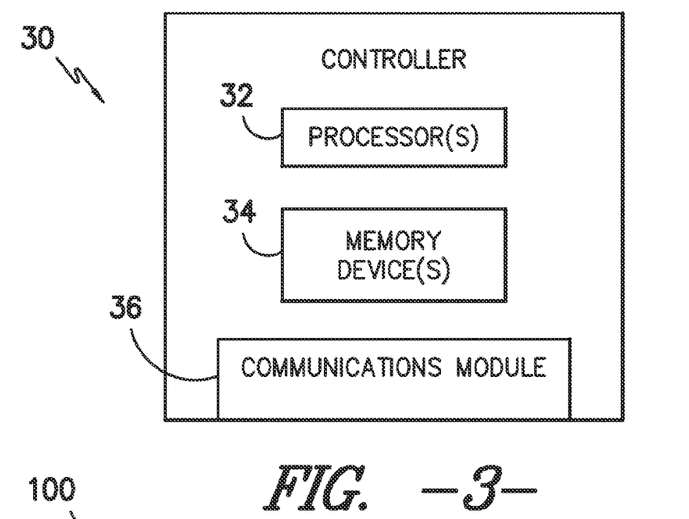
FIG. 3 illustrates a schematic diagram of one embodiment of various components that may be included within an electronic controller of the work vehicle shown in FIG. 1.

Referring now to FIG. 3, a block diagram of one embodiment of suitable components that may be included within the controller 30 of the work vehicle 10 is illustrated in accordance with aspects of the present subject. In general, the controller 30 may comprise a single computer or processing unit or the controller 30 may comprise a combination of computers or processing units that together form all or part of a control system of the work vehicle 10. For example, in several embodiments, the controller 30 may include a primary controller for selecting the most suitable erpm and gear settings when the work vehicle 10 is operating in the automatic speed control mode and one or more secondary controllers (e.g., an electronic engine controller and/or an electronic transmission controller) for controlling the operation of the engine 22 and/or transmission 24. Thus, it should be appreciated that, when the controller 30 is described herein as transmitting control signals to the engine 22 and/or the transmission 24, a single controller may be transmitting the control signals directly to the engine 22 and/or transmission 24 or the control signals may be transmitted to the engine 22 and/or the transmission 24 via a plurality of controllers, such as by transmitting the control signals from a primary controller to the engine 22 and/or the transmission 24 through a separate engine and/or transmission controller.

As shown in FIG. 3, the controller 30 may generally include one or more processor(s) 32 and associated memory device(s) 34 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 34 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 34 may generally be configured to store suitable computer-readable instructions that, when implemented by the processor(s) 32, configure the controller 30 to perform various functions including, but not limited to, selecting the most suitable erpm and gear settings for the work vehicle 10, controlling the engine 22 and transmission 24 in order to implement erpm and gear changes, monitoring timing parameters of the erpm and gear changes and various other suitable computer-implemented functions.

Additionally, the controller 30 may also include a communications module 36 to facilitate communications between the controller 30 and the various components of the work vehicle 10. For instance, the communications module 36 may serve as an interface to permit the controller 30 to transmit suitable control signals to the engine 22 and/or the transmission 24 for implementing erpm and gear changes. In addition, the communications module 36 may also serve as an interface to permit operator inputs (e.g., from control devices 20) to be transmitted to the controller 30.

Figure 4:
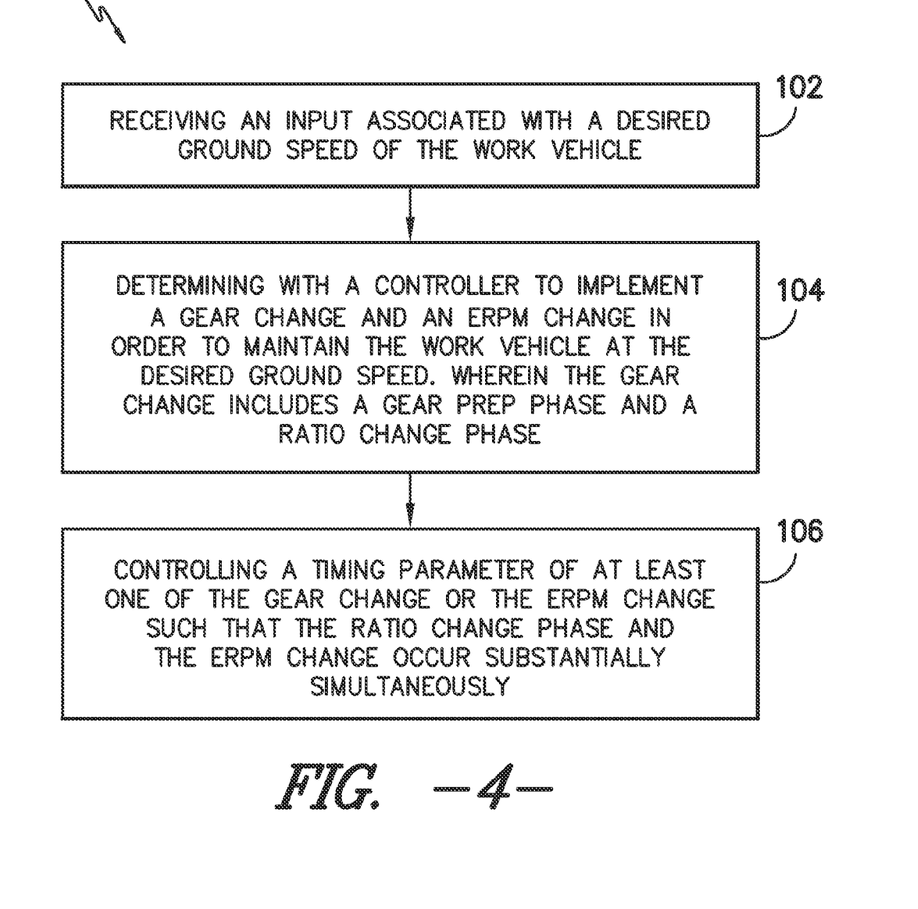
FIG. 4 illustrates a flow a diagram of one embodiment of a method for operating a work vehicle in an automatic speed control mode.

Referring now to FIG. 4, there is illustrated one embodiment of a method 100 for operating a work vehicle in an automatic speed control mode. As shown, the method 100 generally includes receiving an input associated with a desired ground speed of the work vehicle 102, determining with a controller to implement a gear change and an erpm change in order to maintain the work vehicle at the desired ground speed, wherein the gear change includes a gear prep phase and a ratio change phase 104 and controlling a timing parameter of at least one of the gear change or the erpm change such that the ratio change phase and the erpm change occur substantially simultaneously 106.

In general, the disclosed method 100 provides for improved vehicle performance by enhancing the motion smoothness of a work vehicle 10 operating in an automatic speed control mode. Specifically, as indicated above, conventional automatic speed control modes implement erpm and gears changes by simultaneously transmitting control signals to both the engine 22 and the transmission 24 of the work vehicle 10. However, due to the differences in component responses to the control signals, the erpm and gear changes are often initiated at different points in time and/or occur at different rates. As a result, the ground speed of the work vehicle 10 momentarily increases or decreases by a significant degree, thereby causing the motion of the vehicle to feel jerky or rough. To address such disadvantages in the prior art, the inventors of the present subject matter have discovered that, by controlling a timing parameter of the gear change and/or the erpm change such that the ratio change phase and the erpm change occur substantially simultaneously, the motion of the work vehicle 10 may be smoothed significantly.

It should be appreciated that the disclosed method 100 will generally be described herein with respect to synchronizing erpm changes with the ratio changes occurring within the transmission 24. In other words, for purposes of describing the disclosed method 100, the gear change is set as the master variable and the erpm change is set as the slave variable. This is due primarily to the fact that, for most work vehicles 10, the engine 22 responds faster to control signals than the transmission 24. However, one of ordinary skill in the art should appreciate that the disclosed method 100 may also be utilized in instances in which the erpm change is set as the master variable and the gear change set as the slave variable, which may be desirable for work vehicles 10 in which the transmission 24 responds faster to control signals than the engine 22.

As shown in FIG. 4, in 102, an input is received that is associated with a desired ground speed of a work vehicle 10. Specifically, as described above, the controller 30 may be configured to receive operator inputs related to the desired ground speed. For example, operator inputs may be transmitted to the controller 30 via one or more of the control devices 20 (e.g., a throttle) positioned within the operator's cab 18.

Additionally, in 104, the controller 30 determines to implement both a gear change and an erpm change in order to maintain the work vehicle 10 at the desired ground speed. In particular, as described above, the controller 30 may be configured to receive and analyze various inputs to facilitate selecting the combination of erpm and gear settings that is most suitable for maintaining the work vehicle 10 at the desired ground speed for a given set of operating parameters/conditions. Thus, as the operating parameters/conditions of the work vehicle 10 vary over time (e.g., due to increasing/decreasing loads), the controller 30 may implement gear and erpm changes in order to maximize the efficiency of the work vehicle 10 while still maintaining the desired ground speed. As indicated above, such gear and erpm changes may be initiated by transmitting suitable control signals from the controller 30 to the engine 22 and the transmission 24.

Referring still to FIG. 4, in 106, a timing parameter of the gear change and/or the erpm change is controlled such that that the ratio change phase of the gear changing process and the erpm change occur substantially simultaneously. As indicated above, in most work vehicles 10, the engine 22 responds faster to control signals than the transmission 24. Thus, in several embodiments, the controller 30 may be configured to control a timing parameter of the erpm change based on estimated and/or determined parameters of the gear change. For example, the timing parameter may correspond to an initiation time of the erpm change and/or an erpm change rate of the erpm change (i.e., the rate at which the erpm is changed during the erpm change). In such embodiments, the controller 30 may be configured to control/delay the initiation of the erpm change based on the amount of time required to complete the gear prep phase of the gear changing process and/or set/adjust the erpm change rate based on a ratio change rate of the ratio change phase (i.e., the rate at which the gear ratio is changed during the ratio change phase).

It should be appreciated that the specific amount of time required to complete the gear prep phase of the gear changing process may vary significantly based on various operating conditions/parameters of the work vehicle 10, such as fluid temperatures (e.g., oil temperatures), vehicle loads, valve conditions and/or the like. In addition, the amount of time may also differ from gear-to-gear based on the number of clutches (e.g., two, four or six) that must be swapped during the gear change. Thus, in several embodiments, the controller 30 may be configured to estimate and/or directly measure the amount of time required to complete the gear prep phase for the particular gear change being implemented in order to determine when the gear changing process transitions from the gear prep phase to the ratio change phase, thereby allowing the controller 30 to synchronize the initiation of the erpm change with the ratio change phase.

For instance, in one embodiment, the controller 30 may be configured to estimate the amount of time required to complete the gear prep phase based on information stored in its memory 34. Specifically, information may be stored in the controller 30 that relates to the particular time spans required to complete the gear prep phase for each gear change under various operating conditions (e.g., differing fluid temperatures, vehicle loads, valve conditions and/or the like). This information may be pre-stored in the controller 30 (e.g., by being based on work vehicles 30 having the same or similar specifications) and/or may be accumulated by the controller 30 during operation of the work vehicle 30 (e.g., by monitoring the time spans for each gear change and storing the time spans, along with the corresponding operating conditions/parameters, into the controller's memory 34).

In addition to utilizing information stored in the controller's memory 34 or as an alternative thereto, the controller 30 may be configured to monitor the gear change as it occurs, thereby permitting the controller 30 to directly detect the transition between the gear prep phase and the ratio change phase. For instance, the controller 30 may be configured to continuously monitor the input speed and the output speed of the transmission 24 (e.g., by using suitable speed sensors to monitor the speed of the input and output shafts of the transmission 24) and/or continuously monitor the internal shaft speeds of the transmission 24 (e.g., by using speed sensors to monitor shaft speeds within the transmission 24 before and after one or more clutches). By closely monitoring these speeds, the controller 30 may immediately detect when a gear ratio change occurs within the transmission 24, thereby indicating the transition between the gear prep phase and the ratio change phase. Alternatively, the controller 30 may be configured to detect clutch slippage within the transmission 24, thereby providing an indication of the transition between the gear prep phase and the ratio change phase. As is generally understood, clutch slippage may be a function of the clutch capacity, the hydraulic pressure and the load sustained by the clutch. In some conditions, previous gear changes may reveal gear performance characteristics for future gear changes.

Regardless, by determining when the gear change begins transition from the gear prep phase to the ratio change phase, the controller 30 may be configured to synchronize the initiation of the erpm change with the initiation of the ratio change phase. For instance, in several embodiments, the controller 30 may be configured to transmit an initial engine control signal for initiating the erpm change as soon as the transition from the gear prep phase to the ratio change phase occurs. However, in other embodiments, the controller 30 may be configured to transmit the initial engine control signal immediately prior to the transition (i.e., at a point in time within the gear prep phase). Specifically, it is often the case that there is a short time delay between the time at which the initial engine control signal is sent and the time at which the engine responds and the erpm change is initiated. Thus, by advancing the transmission of the initial engine control signal by a period of time corresponding to the time delay for the engine response, the erpm change may be initiated simultaneously with ratio change phase.

Figure 5:
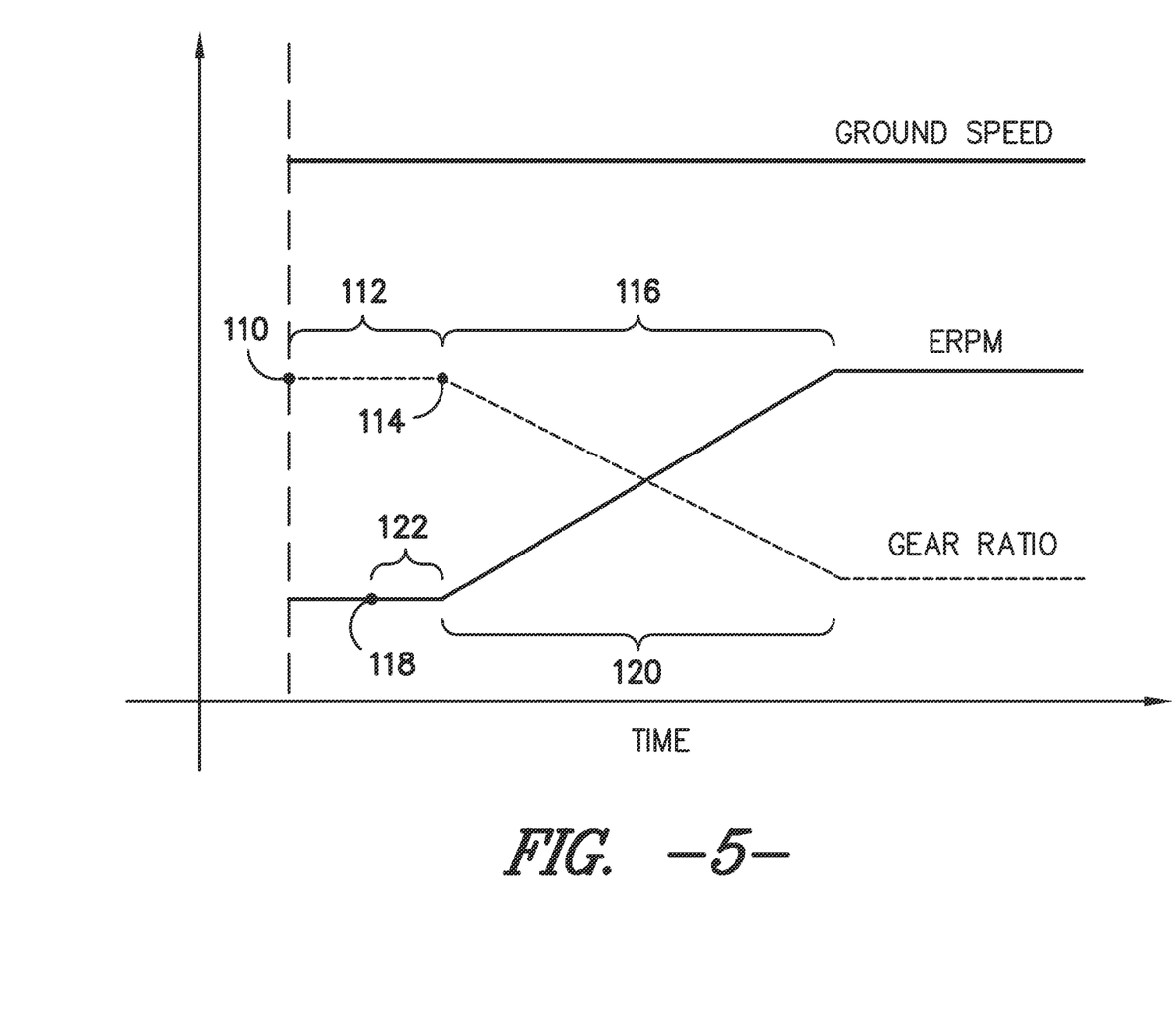
FIG. 5 illustrates one embodiment of a graph charting vehicle speed, gear ratio and erpm with respect to time, particularly illustrating synchronized gear and erpm changes.

For example, FIG. 5 illustrates one embodiment of a graph charting vehicle speed, gear ratio and erpm with respect to time, particularly illustrating synchronized gear and erpm changes. As shown, a transmission control signal may be initially sent to the transmission 24 (indicated by point 110) in order to initiate the gear change, whereby the transmission 24 undergoes the gear prep phase 112 and then transitions (indicated by point 114) to the ratio change phase 116. In addition, an engine control signal may be sent to the engine 22 (indicated by point 118) in order to initiate the erpm change 120. As indicated above, by determining when the gear change transitions to ratio change phase 116 (e.g., by estimating the time required to complete the gear prep phase 112) and by taking into account the time delay in engine response (indicated by 122), the delivery of the engine control signal may be timed such that erpm change 120 occurs substantially simultaneously with the ratio change phase 116. Thus, as shown in FIG. 5, the work vehicle 10 may be maintained at a constant ground speed as both the erpm and gear ratio are changed.

It should be appreciated that, in several embodiments, the time delay for the engine response may be determined and/or estimated based on information stored in the controller 30. For example, information may be stored in the controller's memory 34 that relates to the time delay required to perform erpm changes under various operating conditions/parameters (e.g., differing vehicle loads and/or the like). This information may be pre-stored into the controller's memory 34 (e.g., by being based on work vehicles 10 having the same or similar specifications) and/or may be accumulated by the controller 30 during operation of the work vehicle 10 (e.g., by monitoring the time delays for each erpm change and storing the time delays, along with the corresponding operating conditions/parameters, into the controller's memory 34).

In addition to determining when the gear changing process transitions from the gear prep phase to the ratio change phase, the controller 30 may also be configured to determine a ratio change rate for the ratio change phase (i.e., the rate at which the gear ratio changes during the ratio change phase). Similar to the amount of time required to complete the gear prep phase, the ratio change rate may vary depending on the operating conditions/parameters of the work vehicle 10 fluid temperatures, vehicle loads, valve conditions and/or the like) and/or the particular gears between which the transmission is being shifted. Thus, in one embodiment, the ratio change rate for the gear change being implemented may be estimated based on information stored in the controller 30. Specifically, information may be stored in the controller's memory 34 that relates to ratio change rates for each gear change under various operating conditions/parameters (e.g., differing fluid temperatures, vehicle loads, valve conditions and/or the like). This information may be pre-stored into controller's memory 34 (e.g., by being based on work vehicles 10 having the same or similar specifications) and/or may be accumulated by the controller 34 during operation of the work vehicle 10 (e.g., by monitoring the ratio change rates for each gear change and storing the rates, along with the corresponding operating conditions/parameters, into the controller's memory 34). In addition, the controller 30 may be configured to directly monitor the ratio change rate as the ratio change phase is occurring. For instance, the controller 30 may be configured to continuously monitor the input speed and the output speed of the transmission 24 and/or continuously monitor the internal shaft speeds of the transmission 24. By closely monitoring these speeds, the controller 30 may be able detect gear ratio changes as they occur during the gear shift, thereby allowing the controller 30 to determine the ratio change rate at each instance during the shift.

By determining the ratio change rate for the particular gear change being implemented, the controller 30 may be configured to appropriately set/adjust the erpm change rate for the erpm change in order to further synchronize the gear and erpm changes. Specifically, by estimating the ratio change rate for the gear change, the controller 30 may be configured to set an initial erpm change rate for the erpm change. For example, if it is determined that a gear change typically occurs at a certain ratio change rate (e.g., a 10% gear ratio change every 0.1 seconds), then the erpm change may be set at a corresponding erpm change rate (e.g., a 10% erpm change every 0.1 seconds). Thus, assuming the ratio change rate remains constant during the ratio change phase, the erpm change and the gear change may be completely synchronized.

However, in instances in which the ratio change rate varies during the ratio change phase, the controller 30 may be configured to continuously adjust the erpm change rate (e.g., by transmitting suitable control signals to the engine 22) based on the variations in the ratio change rate. Specifically, as indicated above, the controller 30 may be configured to continuously monitor the ratio change rate by analyzing the input/output speeds and/or the internal shaft speeds of the transmission 24. This may allow the controller 30 to detect any variations in the ratio change rate and subsequently transmit suitable control signals to the engine 22 so that corresponding changes to the erpm change rate may be implemented. For instance, in one embodiment, the controller 30 may be configured to make one-to-one adjustments to the erpm change rate based on the variations in the ratio change rate, such as by adjusting the erpm change rate from 10% per 0.1 seconds to 15% per 0.1 seconds when the ratio change rate increases from 10% per 0.1 seconds to 15% per 0.1 seconds. In alternative embodiments, the erpm change rate may be adjusted to a lesser extent or greater extent than the actual variation in the ratio change rate so as to accommodate any time delays in the engine response. For example, when it is determined that the ratio change rate has increased from 10% per 0.1 seconds to 15% per 0.1 seconds, the erpm change rate may be increased from 10% per 0.1 seconds to 17% per 0.1 seconds or to 20% per 0.1 seconds. Such adjustments to the erpm change rate may allow for the erpm change to remain synchronized with the gear change despite any time delays in engine response.

Additionally, it should be appreciated that, under some operating conditions (e.g. high loads and/or low speeds), the gear ratio may undershoot and/or overshoot during the ratio change phase, resulting in rapid and short variations in the ratio change rate. In such instances, it may not be desirable to attempt to control the erpm to follow such undershoots and/or overshoots, as doing so may require the erpm to be adjusted outside its normal and/or desired working range and/or the engine 22 may not be capable of responding as fast enough. Thus, in several embodiments, the controller 30 may be configured to control the engine 22 such that the erpm change is not synchronized with any undershoots and/or the overshoots of the transmission 24, thereby maintaining the erpm within its normal and/or desired working range.

Figure 6:
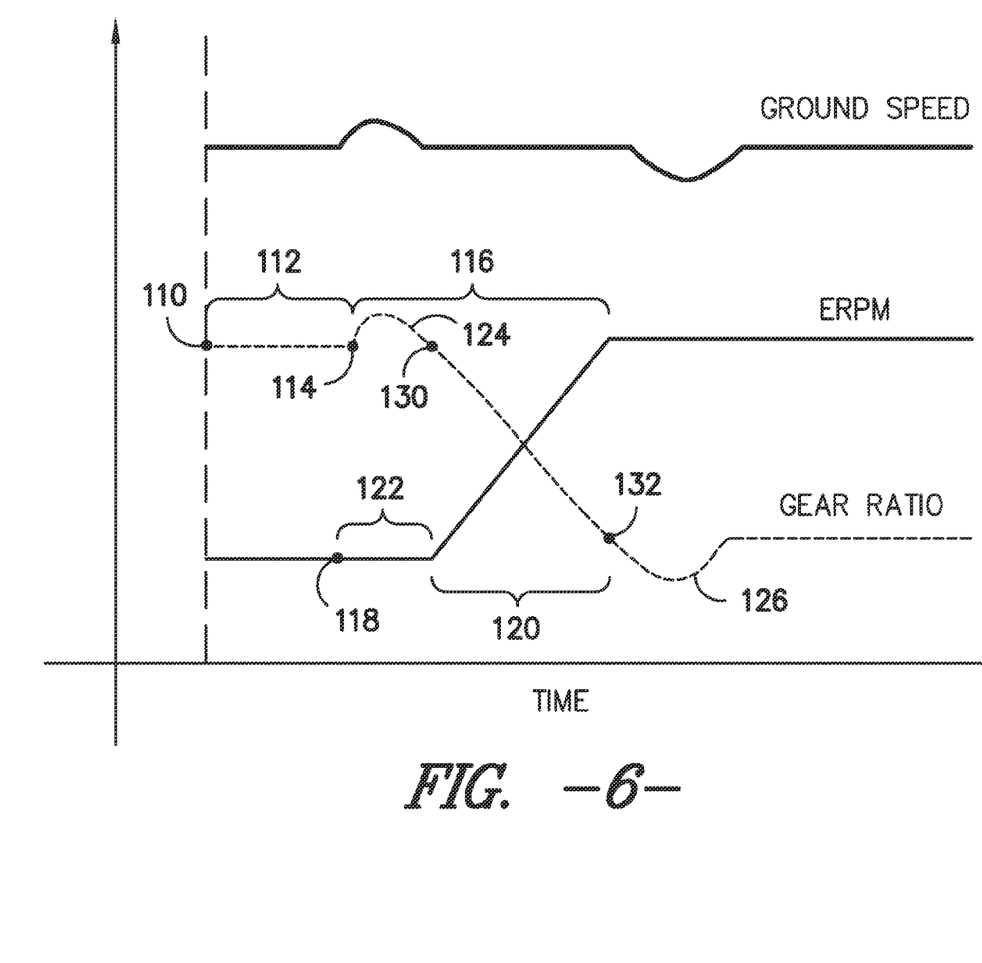
FIG. 6 illustrates another embodiment of a graph charting vehicle speed, gear ratio and erpm with respect to time, particularly illustrating synchronized gear and erpm changes when the gear ratio both undershoots and overshoots during the ratio change phase.

For example, FIG. 6 illustrates one embodiment of a graph charting vehicle speed, gear ratio and erpm with respect to time, particularly illustrating synchronized gear and erpm changes when the gear ratio both undershoots and overshoots during the ratio change phase. As shown, similar to the graph illustrated in FIG. 5, a transmission control signal may be initially sent to the transmission 24 (indicated by point 110) in order to initiate the gear change, whereby the transmission 24 undergoes the gear prep phase 112 and then transitions (indicated by point 114) to the ratio change phase 116. However, as shown in the graph, the gear ratio initially overshoots (indicated by 124), resulting in an undesirable increase in the gear ratio for short period of time, and then undershoots (indicated by 126) at the end of the ratio change phase 116, resulting in an undesirable decrease in the gear ratio for a short period of time. In such instance, the controller 30 may be configured to control the initiation and/or the erpm change rate of the erpm change 120 such that the erpm change 120 is synchronized with the ratio change phase 116 within its expected gear ratio range 128 (i.e., the range of gear ratios defined between the old and new gear ratios for the gear change being implemented). For example, as shown in FIG. 6, the timing of the delivery of the initial engine control signal (indicated by 118) may be controlled such that, taking into account the time delay in engine response (indicated by 122), the erpm change 120 is initiated at the point (indicated by 130) at which the gear ratio returns within the expected gear ratio range 128. Similarly, the erpm change rate may be controlled based on the ratio change rate such that the erpm change 120 is completed at the point (indicated by 132) immediately prior to the gear ratio falling outside of the expected gear ratio range 128.

By controlling the erpm in the manner shown in FIG. 6, it should be appreciated that the work vehicle 10 may experience slight variations in ground speed during any undershoots and/or overshoots of the transmission 24. However, it is believed by the inventors of the present subject matter that the effect of such overshoots and/or undershoots may be substantially absorbed by the elastic components in the drive train 28 of the work vehicle 10, thereby minimizing any jerkiness in the motion of the vehicle 10 caused by the slight variations in ground speed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a work vehicle in an automatic speed control mode, the method comprising:
    receiving an input associated with a desired ground speed of the work vehicle;
    determining with a controller to implement a gear change and an erpm change in order to maintain the work vehicle at the desired ground speed, wherein the gear change includes a gear prep phase and a ratio change phase; and
    controlling a timing parameter of at least one of the gear change or the erpm change such that the ratio change phase and the erpm change occur substantially simultaneously.

2. The method of claim 1, further comprising:
    determining when the gear change transitions between the gear prep phase and the ratio change phase; and
    determining a time delay for the initiation of the erpm change.

3. The method of claim 2, wherein controlling a timing parameter of at least one of the gear change or the erpm change such that the ratio change phase and the erpm change occur substantially simultaneously comprises controlling the delivery of an engine control signal based on the time delay such that the erpm change is initiated at the transition between the gear prep phase and the ratio change phase.

4. The method of claim 2, wherein controlling a timing parameter of at least one of the gear change or the erpm change such that the ratio change phase and the erpm change occur substantially simultaneously comprises controlling the delivery of an engine control signal based on the time delay such that the erpm change is initiated within an expected ratio range for the gear change.

5. The method of claim 2, wherein determining when the gear change transitions between the gear prep phase and the ratio change phase comprises estimating when the gear change will transition between the gear prep phase and the ratio change based on information stored in the controller or monitoring when the gear change transitions between the gear prep phase and the ratio change phase based on an input speed and an output speed of a transmission the work vehicle or based on internal shaft speeds of the transmission.

6. The method of claim 2, wherein determining a time delay for the initiation of the erpm change comprises estimating the time delay based on information stored in the controller.

7. The method of claim 1, further comprising determining a ratio change rate for the ratio change phase.

8. The method of claim 7, wherein determining a ratio change rate for the ratio change phase comprises estimating the ratio change rate based on information stored in the controller.

9. The method of claim 7, wherein determining a ratio change rate for the ratio change phase comprises monitoring the ratio change rate based on an input speed and an output speed of a transmission the work vehicle or based on internal shaft speeds of the transmission.

10. The method of claim 7, wherein controlling a timing parameter of at least one of the gear change or the erpm change such that the ratio change phase and the erpm change occur substantially simultaneously comprises setting an initial erpm change rate for the erpm change based on the ratio change rate for the ratio change phase.

11. The method of claim 10, further comprising adjusting the initial erpm change rate based on a variation in the ratio change rate during the ratio change phase.

12. The method of claim 11, wherein adjusting the initial erpm change rate based on a variation in the ratio change rate during the ratio change phase comprises adjusting the initial erpm rate to a lesser extent or a greater extent than the variation in the ratio change rate.

13. A work vehicle, comprising:
an engine;
a transmission coupled to the engine;
a controller configured to control an erpm change of the engine and a gear change of the transmission in order to maintain a desired ground speed of the work vehicle, the gear change including a gear prep phase and a ratio change phase,
wherein the controller is further configured to control a timing parameter of at least one of the gear change or the erpm change such that the ratio change phase and the erpm change occur substantially simultaneously.

14. The work vehicle of claim 13, wherein the timing parameter comprises at least one of an initiation time for the erpm change or an erpm change rate for the erpm change.

15. The work vehicle of claim 13, wherein the controller is configured to determine when the gear change transitions between the gear prep phase and the ratio change phase and is configured to determine a time delay for the initiation of the erpm change.

16. The work vehicle of claim 15, wherein the controller is further configured to control the delivery of an engine control signal based on the time delay such that the erpm change is initiated at the transition between the gear prep phase and the ratio change phase.

17. The work vehicle of claim 15, wherein the controller is further configured to control the delivery of an engine control signal based on the time delay such that the erpm change is initiated within an expected ratio range for the gear change.

18. The work vehicle of claim 13, wherein the controller is configured to determine a ratio change rate for the ratio change phase.

19. The work vehicle of claim 18, wherein the controller is further configured to set an initial erpm change rate for the erpm change based on the ratio change rate.

20. The work vehicle of claim 19, wherein the controller is configured to adjust the initial erpm change rate based on a variation in the ratio change rate during the ratio change phase.

* * * * *